Patented Oct. 19, 1954

2,692,191

UNITED STATES PATENT OFFICE 2,692,191

UNSATURATED MINERAL OIL DISTILLATE CONTAINING A MERCAPTOBENZIMIDAZOLE AND AN ARYLIDENE AMINE

Nelson B. Haskell, Port Arthur, Tex., assignor to The Texas Company, New York, N. Y., a corporation of Delaware No Drawing. Application June 24, 1952, Serial No. 295,347

7 Claims. (Cl. 44—63)

This invention relates to a mineral oil composition, and more particularly to an unsaturated mineral oil, such as cracked gasoline, which is stabilized both against corrosion of metals and also against gum or sludge formation.

In copending application of Thomas C. Roddy, Jr., Serial No. 285,551 filed May 1, 1952, now Pat. No. 2,642,396, there is disclosed and claimed a mineral oil composition containing a mercapto-alkyl-benzimidazole as a superior corrosion inhibitor. It has been found that, when this type of corrosion inhibitor is employed in a mineral oil containing unsaturated constituents, such as cracked gasoline, the said corrosion inhibitor has the disadvantage of functioning as a gum accelerator; and this difficulty is not corrected by the use of the customary gum inhibitors.

A principal object of the present invention is to overcome the foregoing objection and to provide an unsaturated mineral oil composition containing the superior mercapto-alkylbenzimidazole as the effective corrosion inhibitor, and which is at the same time stabilized against gum or sludge formation on storage.

The effective mercapto-alkylbenzimidazoles of said prior application have the formula

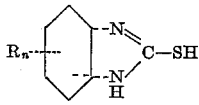

where R is an alkyl radical containing from 1 to 30 carbon atoms, and $n$ is whole number from 1 to 3 and represents the number of hydrocarbons of the benzene nucleus which have been substituted by alkyl radicals. As examples of these mercapto-alkylbenzimidazoles there may be mentioned the compounds in which $R_n$ in the above formula is methyl, ethyl, propyl, butyl, amyl, hexyl, octyl, decyl, dodecyl, cetyl, C12 to C30 as obtained from cuts or fractions from propylene or butylene polymer, and C20 to C30 as obtained from paraffin wax; also, the same di-alkyl and tri-alkyl substituted compounds, such as mercapto-diamyl benzimidazole; as well as those containing di- or tri- substituted dissimilar alkyl groups, such as mercapto-methyl octyl-, mercapto-butyl dodecyl-, and mercapto-methyl di-t-butyl-benzimidazole. In the preparation of these mercapto-alkylbenzimidazoles, the corresponding alkyl substituted ortho-phenylene diamine is reacted with carbon disulfide in excess of the stoichiometric requirement, and the resulting mixture allowed to stand at room temperature for a period of 24–48 hours with the liberation of hydrogen sulfide.

By way of example, the preparation of a mercapto - mono - tertiary - alkyl benzimidazole, which has been found to be a preferred type of inhibitor, was carried out as follows. In this particular case, the tertiary alkyl group substituted for a hydrocarbon atom on the benzene nucleus of mercapto-benzimidazole was a tertiary amyl group, although it is to be understood that other tertiary alkyl, secondary alkyl or normal alkyl groups can be substituted in a similar manner to produce effective corrosion inhibitors. Since tertiary amyl ortho-phenylene diamine was not available, this compound was prepared by using tertiary amyl aniline as a starting material. The latter was nitrated in conventional manner, and para-tertiary amyl ortho nitro aniline was separated from the other isomers obtained in the nitration step. The separated para-tertiary amyl ortho nitro aniline was then reduced by hydrogenation in conventional manner to paratertiary ortho phenylene diamine. The latter was then mixed with $CS_2$ in excess of the stoichiometric amount, and the mixture allowed to stand at room temperature for 24 hours. The reaction may be represented as follows:

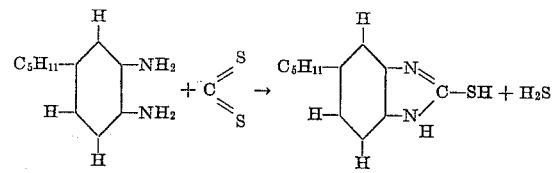

producing 2-mercapto 5-tertiary amylbenzimidazole as the reaction product. The latter was separated from the reaction mix by agitating with aqueous caustic soda to form the sodium salt, filtering, acidifying the aqueous filtrate, separating the precipitated 2-mercapto-5-tertiary amylbenzimidazole, washing and drying. The resulting compound was a white powdery solid insoluble in water and soluble in mineral oils including gasoline and kerosine, when added in benzene solution, to the extent of at least 1–60 pounds per thousand barrels of oil.

As an alternate method of preparation, the mercapto-alkylbenzimidazole may be produced by alkylating ortho phenylene diamine with an aliphatic alcohol in the presence of a suitable Friedel-Crafts catalyst, such as zinc chloride. For example, ortho phenylene diamine alkylated with lauryl alcohol in the presence of zinc chloride gives a mixture of 2-amino 3-lauryl aniline and 2-amino 4-lauryl aniline. The latter compounds, either in admixture or when separated, react with $CS_2$ in the manner set forth above to produce 2-mercapto 4-lauryl benzimidazole and 2-mercapto 5-lauryl benzimidazole. By either alkylating ortho phenylene diamine under more stringent conditions, or by first alkylating aniline to provide double or triple substitution on the benzene nucleus with the ortho position open and followed by nitration and reduction, intermediates may be prepared which then react with CS₂ to produce di- or tri-alkylated mercapto-benzimidazoles.

The foregoing mercapto-alkylbenzimidazoles, when added in a proportion of about 1–60 pounds per thousand barrels of oil, function as superior corrosion inhibitors. Such corrosion inhibitors may be used alone with very effective results in saturated petroleum distillates. However, their use in unsaturated petroleum distillates, such as cracked gasoline, involves an additional problem, since the conventional gum inhibitors have been found to be ineffective in overcoming the objectionable gum accelerating properties of these corrosion inhibitors.

It has now been discovered that this difficulty can be overcome by incorporating in the unsaturated petroleum distillate containing the corrosion inhibitor from about 0.5 to 10 pounds, and preferably about 1 to 3 pounds, per thousand barrels of a Schiff's base reaction product of 1 mol of an aliphatic polyamine having two primary amino groups with 2 mols of an aromatic aldehyde, said Schiff's base reaction product having the formula $$A—CH=N—R—N=CH—A$$

where A represents an aromatic nucleus, and R represents an aliphatic radical having the two nitrogen atoms attached directly to different carbon atoms of the same open chain. Compounds of this type have previously been disclosed as metal deactivators in Downing et al. No. 2,282,513. However, it was entirely unexpected that such Schiff's base reaction products would function to inhibit the gum accelerating tendency of the described class of corrosion inhibitors in this new environment, particularly when the conventional types of most effective and generally employed gum inhibitors proved ineffective for this purpose. Any of the various arylidene amines disclosed in said patent may be employed for purposes of the present invention.

By way of example, the following compounds of this class are listed as being suitable for purposes of the present invention:

Di(2-hydroxy-3-methoxybenzal) ethylenediamine
Di-(2-hydroxybenzal) ethylenediamine
Di-(2-hydroxybenzal) decamethylenediamine
Di-(2-hydroxybenzal) triethylenetetramine
Di-(2-hydroxybenzal) hexamethylenediamine
Di-(2-hydroxybenzal) 1:3-propylenediamine
Dibenzal ethylenediamine
Dibenzal hexamethylenediamine
Dibenzal diethylenetriamine
Dibenzal triethylenetetramine
Disalicylal ethylenediamine As representative of a preferred compound of this class which is commercially available, there may be mentioned disalicylal propylene diamine, which is also known as disalicylidene 1,2 diaminopropane. This is sold under the trade name "DMD" by E. I. du Pont de Nemours and Company.

As illustrative of the unexpected results secured in accordance with the present invention, the following table lists the results obtained on a cracked gasoline with the indicated dosages of the listed inhibitors. The cracked gasoline was a thermally cracked product having typical tests of 90–382° F. distillation range, a 50 per cent point of 247° F., API gravity of 59, bromine No. of 52 and acid heat of 98° F. Samples of the said cracked gasoline containing the inhibitors were subjected as initially prepared to ASTM Induction Period, Copper Dish Gum and ASTM Gum Tests; and the Copper Dish Gum and ASTM Gum Tests were also made on the samples after storage for periods of 1, 3 and 6 months, with the following results:

TABLE

*Cracked gasoline*

| Inhibitor | Dosage lbs./M bbl. | ASTM Ind. Period, Min. | Cu Dish Gum, mg./100 ml. | | | | ASTM Gum, mg./100 ml. | | | |
|---|---|---|---|---|---|---|---|---|---|---|
| | | | In. | 1 | 3 | 6 | In. | 1 | 3 | 6 |
| 1. None | 0 | 140 | 23 | 47 | 81 | 70 | 1 | 13 | 12 | 19 |
| 2. Gum Inhibitor #1 ᵃ | 20 | 325 | 5 | 23 | 21 | 25 | 1 | 2 | 4 | 3 |
| 3. Gum Inhibitor #2 ᵇ | 20 | 500 | 5 | 8 | 7 | 4 | 1 | 2 | 2 | 1 |
| 4. DMD ᶜ | 10 | 150 | 10 | 17 | 20 | 15 | 1 | 1 | 1 | 1 |
| 5. Alkyl MBI ᵈ | 10 | | | | | | | | | |
|   Gum Inhibitor #1 | 20 | 310 | 7 | 72 | 229 | 401 | 1 | 18 | 32 | 119 |
| 6. Alkyl MBI | 10 | | | | | | | | | |
|   DMD | 5 | 150 | 13 | 12 | 17 | 14 | 2 | 5 | 4 | 4 |
| 7. Alkyl MBI | 10 | | | | | | | | | |
|   DMD | 5 | | | | | | | | | |
|   Gum Inhibitor #1 | 20 | 345 | 10 | 18 | 18 | 15 | 2 | 6 | 4 | 5 |
| 8. Alkyl MBI | 10 | 165 | 24 | 370 | 808 | ᵉ 578 | 4 | 93 | 357 | ᶠ 2 |
| 9. Alkyl MBI | 10 | | | | | | | | | |
|   Gum Inhibitor #2 | 10 | 320 | 14 | 230 | ᶠ 41 | ᵉ 1,134 | 3 | 58 | ᶠ 14 | 432 |

ᵃ Composition of Gum Inhibitor #1:
  By weight—

42% 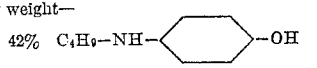

6% 

52% Solvent (90% isopropyl alcohol+10% methyl alcohol).
ᵇ Para dibutylphenylene diamine.
ᶜ 80% disalicylidene 1,2-diaminopropane+20% xylene.
ᵈ 2-mercapto-5t-amylbenzimidazole.
ᵉ Residue oily.
ᶠ Result out of line.

The ASTM Induction Period Test (ASTM method D525–46) is a determination of the stability of gasoline under accelerated oxidation conditions, and may be used as an indication of the tendency of the gasoline to form gum on storage. In this test, a 50 ml. sample is placed in a bomb which is filled with oxygen at 100 pounds per square inch at 15-25° C. The bomb is then placed in a boiling water bath and maintained at 98-102° C. The pressure is read at stated intervals and recorded continuously until the so-called break point is reached. The latter is the point in the pressure-time curve that is preceded by a pressure drop of 2 pounds per square inch within 15 minutes and succeeded by a drop of not less than 2 pounds per square inch in the following 15 minutes. The induction period is reported as the time in minutes elapsed between the placing of the bomb in the bath and the break point.

The Copper Dish Gum Test is a measure of the gum stability of the gasoline in storage and of the tendency of the gasoline to deposit gum in fuel systems containing copper. In this test, 100 ml. of the gasoline sample are placed in a highly polished weighed copper dish and the latter is mounted on a steam bath at 99.5-100° C. under a hood with air circulation over the top of the sample until it has evaporated to dryness. Then the dish is placed in an oven and heated at 100-105° C. for about ½-1½ hours until no appreciable further loss in weight occurs. The dish is then cooled in a desiccator and weighed. The increase in weight is reported as milligrams of gum per 100 ml. of sample.

The ASTM Gum Test is carried out in a similar manner, except that it is an uncatalyzed test wherein the sample is evaporated in a glass dish instead of a copper dish.

In the foregoing table, sample 1 represents the blank, and samples 2, 3 and 4 represent the gasoline containing the most effective gum inhibitors and metal deactivators respectively in the absence of the mercapto-alkylbenzimidazole corrosion inhibitor. Sample 8 represents the gasoline containing the mercapto-alkylbenzimidazole alone. It will be seen that this compound greatly accelerated the gum forming tendencies of the cracked gasoline on storage. Samples 5 and 9 show the combination of the mercapto-alkyl-benzimidazole with the conventional gum inhibitors, and demonstrate that the latter were completely ineffective in correcting the gum alcelerating effect of the corrosion inhibitor. Sample 6 shows that the combination of the corrosion inhibitor with the disalicylal propylene diamine was unexpectedly effective in inhibiting this gum forming tendency or storage; and sample 7 demonstrates that this combination plus a conventional gum inhibitor provides similar gum inhibiting effect plus improved induction period response.

While the present invention is particularly valuable in the case of light petroleum distillates of the character of thermally and catalytically cracked gasolines, it is also useful in connection with heavier distillates of the character of kerosines and fuel oils. For example, fuel oils containing a proportion of catalytically or thermally cracked fractions can be effectively inhibited against sludge formation and deposition in storage tanks and strainers, while at the same time securing the benefit of the effective corrosion inhibitor. In cracked gasolines, the proportion of corrosion inhibitor employed is generally about 1 to 30 pounds, and preferably about 5 to 10 pounds, per thousand barrels of oil. In heavier distillates, such as fuel oil containing cracked components, the proportion of corrosion inhibitor may be increased up to about 60 pounds per thousand barrels of oil. Ordinarily, the Schiff's base reaction product is used in cracked gasoline in the proportion of about 0.5 to 5 pounds, and preferably 1-2 pounds, per thousand barrels of oil. In heavier distillates, the proportion of Schiff's base reaction product may be increased up to about 10 pounds per thousand barrels of oil.

Obviously many modifications and variations of the invention, as hereinbefore set forth may be made without departing from the spirit and scope thereof, and therefore only such limitations should be imposed as are indicated in the appended claims.

I claim:
1. An unsaturated mineral hydrocarbon oil in the range of gasoline to fuel oil and normally corrosive to metal, about 1 to 60 pounds per thousand barrels of the oil effective to inhibit said corrosion of an alkyl substituted mercaptobenzimidazole of the formula

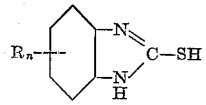

where R represents any alkyl radical containing from 1 to 30 carbon atoms, and $n$ is a whole number from 1 to 3 and represents the number of hydrogen atoms on the benzene nucleus which have been substituted by any alkyl radical or radicals represented by R, said oil containing said corrosion inhibitor normally being unstable with respect to gum formation on storage, and about 0.5 to 10 pounds per thousand barrels of oil effective to inhibit said gum formation of a Schiff's base reaction product of one mol of an aliphatic polyamine having two primary amino groups with two mols of an aromatic aldehyde, said Schiff's base reaction product having the formula $$A-CH=N-R-N=CH-A$$

where A represents an aromatic nucleus, and R represents an aliphatic radical having the two N atoms attached directly to different carbon atoms of the same open chain.

2. An unsaturated mineral hydrocarbon oil according to claim 1, wherein the Schiff's base reaction product is a disalicylal alkylene diamine.

3. An unsaturated mineral hydrocarbon oil according to claim 1, wherein the Schiff's base reaction product is disalicylal propylene diamine.

4. An unsaturated mineral hydrocarbon oil according to claim 1, wherein the alkyl substituted mercaptobenzimidazole is a 2-mercapto-monoalkylbenzimidazole.

5. An unsaturated mineral hydrocarbon oil according to claim 4, wherein the Schiff's base reaction product is a disalicylal alkylene diamine.

6. A cracked gasoline containing 1 to 30 pounds per thousand barrels of a 2-mercapto-monoalkylbenzimidazole wherein the alkyl group contains 1 to 30 carbon atoms, and 0.5 to 10 pounds per thousand barrels of a disalicylal alkylene diamine.

7. A cracked gasoline containing 5 to 10 pounds per thousand barrels of 2-mercapto-5t-amyl-benzimidazole, and 1 to 3 pounds per thousand barrels of disalicylal propylene diamine.

References Cited in the file of this patent

UNITED STATES PATENTS

| Number | Name | Date |
|---|---|---|
| 2,636,208 | Brown | Jan. 20, 1953 |